(12) United States Patent
Mene et al.

(10) Patent No.: US 12,094,327 B2
(45) Date of Patent: Sep. 17, 2024

(54) HAPTIC EFFECT MANAGEMENT (71) Applicant: INTERNATIONAL BUSINESS MACHINES CORPORATION, Armonk, NY (US)

(72) Inventors: Atul Mene, Morrisville, NC (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/805,480

(22) Filed: Jun. 6, 2022

(65) Prior Publication Data
US 2023/0394935 A1 Dec. 7, 2023

(51) Int. Cl.
*G08B 6/00* (2006.01)
(52) U.S. Cl.
CPC ...................... *G08B 6/00* (2013.01)
(58) Field of Classification Search
CPC ....................................... G08B 6/00
USPC ..................................... 340/407.2
See application file for complete search history.

(56) References Cited

U.S. PATENT DOCUMENTS

| 8,040,224 | B2 | 10/2011 | Hwang | |
|---|---|---|---|---|
| 10,845,894 | B2 | 11/2020 | Wang | |
| 2012/0231839 | A1* | 9/2012 | Seo | H04M 1/72427 455/556.1 |
| 2014/0075355 | A1* | 3/2014 | Kim | H04M 1/72412 715/769 |
| 2014/0282008 | A1 | 9/2014 | Verard | |
| 2015/0268726 | A1 | 9/2015 | Saboune | |
| 2016/0144404 | A1* | 5/2016 | Houston | H02K 33/00 318/114 |
| 2016/0258758 | A1* | 9/2016 | Houston | G01D 5/145 |
| 2016/0349936 | A1* | 12/2016 | Cho | G06F 3/04897 |
| 2017/0046503 | A1* | 2/2017 | Cho | G16H 40/63 |
| 2017/0075701 | A1 | 3/2017 | Ricci | |
| 2019/0324546 | A1 | 10/2019 | Lee | |
| 2021/0208684 | A1* | 7/2021 | Eagleman | G08B 6/00 |
| 2022/0395861 | A1* | 12/2022 | Snow | G06F 3/016 |

OTHER PUBLICATIONS

Disclosed Anonymously, "Method and System for Holographic Object Interaction Based on Environmental Parameters", An IP.com Prior art Database Technical Disclosure, IP.com No. IPCOM000246748D, Jun. 29, 2016.

(Continued)

*Primary Examiner* — Jack K Wang
(74) *Attorney, Agent, or Firm* — James L. Olsen (57) ABSTRACT

Aspects of the present disclosure relate to haptic effect management. A haptic effect that is captured using a vibration sensor can be obtained, the haptic effect defined by a waveform. The haptic effect can be saved to a haptic effect library, the haptic effect library containing a plurality of captured haptic effects. The haptic effect can be mapped to at least one software feature, wherein the haptic effect is generated in response to the at least one software feature being activated.

20 Claims, 7 Drawing Sheets

(56) References Cited

OTHER PUBLICATIONS

Disclosed Anonymously,, "Method and System for Airport Baggage Security Checking with Holographic Object Navigation", An IP.com Prior Art Database Technical Disclosure, IP.com No. IPCOM000246751D, Jun. 29, 2016.

IBM/ARVR Design Language, "Approach UX Holistically", 2 Pgs. Downloaded Apr. 12, 2022, <http://ibm-design-language.eu-de.mybluemix.net/design/language/experi . . . >.

Immersion, "Haptics in Touch Screen Hand-Held Devices", Aug. 2017, 10 Pgs.

Markets and Markets, "Haptic Technology Market by Component, Application /COVID-19 Impact", Downloaded from internet on Apr. 13, 2022, 12 Pgs, <https://www.marketsandmarkets.com/Market-report/haptic-technology . . . >.

Mell et al., "The NIST Definition of Cloud Computing", National Institute of Standards and Technology, Special Publication 800-145, Sep. 2011, 7 pages.

Vanblon et al., ", Haptic Device Input and Output", An IP.com Prior Art Database Technical Disclosure, IP.com No. IPCOM000221041D, Aug. 23, 2012.

\* cited by examiner

HAPTIC EFFECT MANAGEMENT

BACKGROUND

The present disclosure relates generally to the field of computing, and in particular, to haptic effect management.

Devices incorporating haptic technology generate forces, vibrations, and/or motions to simulate the sense of touch in a user experience. Haptic feedback can be generated in response to user input (e.g., user touch actions received by tactile sensors of a touch screen) or based on pre-defined rules. Haptic technology is frequently integrated in virtual reality (VR) technology due to the added immersivity haptic feedback offers. For example, a user within a VR environment can manipulate and interact with virtual objects using haptic feedback. Technologies that can be used in haptic systems include vibrotactile haptics (e.g., small motors configured to create vibrations with specific frequencies), ultra-sonic mid-air haptics, microfluidics, force control, and surface haptics. Types of haptic feedback that can be provided to a user include vibration, force feedback, air vortices, and ultrasound feedback.

SUMMARY

Embodiments of the present disclosure are directed to a method and computer program product for haptic effect management. A haptic effect that is captured using a vibration sensor can be obtained, the haptic effect defined by a waveform. The haptic effect can be saved to a haptic effect library, the haptic effect library containing a plurality of captured haptic effects. The haptic effect can be mapped to at least one software feature, wherein the haptic effect is generated in response to the at least one software feature being activated.

Embodiments of the present disclosure are also directed to a system for haptic effect management. A haptic effect can be captured by a vibration sensor of a user device, the haptic effect defined by a waveform. The haptic effect can be saved to a haptic effect library, the haptic effect library containing a plurality of captured haptic effects. The haptic effect can be mapped to at least one software feature, wherein the haptic effect is generated in response to the at least one software feature being activated.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to haptic effect management. While the present disclosure is not necessarily limited to such applications, various aspects of the disclosure can be appreciated through a discussion of various examples using this context.

Devices incorporating haptic technology generate forces, vibrations, and/or motions to simulate the sense of touch in a user experience. Haptic feedback can be generated in response to user input (e.g., user touch actions received by tactile sensors of a touch screen) or based on pre-defined rules. Haptic technology is frequently integrated in virtual reality (VR) technology due to the added immersivity haptic feedback offers. For example, a user within a VR environment can manipulate and interact with virtual objects using haptic feedback. Technologies that can be used in haptic systems include vibrotactile haptics (e.g., small motors configured to create vibrations with specific frequencies), ultra-sonic mid-air haptics, microfluidics, force control, and surface haptics. Types of haptic feedback that can be provided to a user include vibration, force feedback, air vortices, and ultrasound feedback.

A haptic effect can be defined by an input waveform (e.g., a sine wave, a square wave, a saw wave, etc.). The input waveform can specify the frequency/amplitude over time required to generate vibration associated the haptic effect. The input waveform can be used to control a haptic actuator which can be configured to generate vibration corresponding to the haptic effect. Haptic actuators receive power from a power source (e.g., a battery or power supply). Control signals (e.g., defined based on the waveform of a haptic effect and feedback signals during vibration) can be issued to modulate power provided to a haptic actuator for a designated time period to generate a desired haptic effect. Haptic actuators can be integrated into a variety of electronic devices, including smart phones, wearables, controllers, tablets, and laptop computers, among other devices. Types of haptic actuators that can be integrated into electronic devices include eccentric rotating mass (ERM) actuators, linear resonant actuators (LRAs), piezo modules, and electro-active polymer actuators (EAPS), among other types of haptic actuators.

Haptic effects can be generated/provided to users in response to observed software execution events, such as received user inputs. For example, the type of haptic effect (e.g., vibration frequency/amplitude) to be issued to a user can depend on user input parameters such as a type of touch input (e.g., a "swipe" versus a "tap" versus a "press and hold" touch input) and a location the touch input was received. Within video games or virtual environments, haptic effects can be issued through controllers based on occurring in-game events and objects. As an example, a first haptic effect for a heartbeat within a video game can have a different input waveform (e.g., a time-based frequency/amplitude curve defining the haptic effect to be issued) than a second haptic effect for a car engine. The first haptic effect attempting to mimic the heartbeat can have an input waveform that defines reoccurring heartbeat pulses over time, where the second haptic effect attempting to mimic the car engine can have an input waveform that defines the vibration frequency of the car engine over time.

Conventionally, haptic effects issued responsive to software execution events (e.g., user inputs) are pre-defined. That is, input waveforms defining haptic effects are pre-defined and are generated responsive to some trigger event (e.g., an in-game event or a received touch input) determined by a controller or processor. The user does not have the ability to define haptic effects they want to trigger at different times. Further, the haptic effects may not mirror vibrations associated with various contextual conditions observed in reality (e.g., a physical environment). Improvements are needed in haptic technology to allow various haptic effects to be captured and triggered in specific scenarios for users to improve flexibility and usability of haptic systems.

Aspects of the present disclosure relate to haptic effect management. A haptic effect that is captured using a vibration sensor can be obtained, the haptic effect defined by a waveform. The haptic effect can be saved to a haptic effect library, the haptic effect library containing a plurality of captured haptic effects. The haptic effect can be mapped to at least one software feature, wherein the haptic effect is generated in response to the at least one software feature being activated. In embodiments, haptic effects within the haptic effect library can be visualized and/or modified (e.g., manually or automatically), and the haptic effect library can be updated to include the modified haptic effects.

Aspects of the present disclosure provide various improvements. By capturing haptic effects from physical environments using a vibration sensor, haptic effects can mirror the vibrations experienced by a user. This can make haptic effects stored and mapped to software functions more realistic than conventional haptic effects. Further, by enabling mapping of haptic effects to software features, the flexibility/customization of the haptic system is enhanced. For example, users can be permitted to generate any desired mappings between captured/modified haptic effects within the haptic effect library and software features of their device. Further still, aspects of the present disclosure can enhance haptic effects via haptic effect modification. For example, users can be permitted to visualize and feel haptic effects before and after manual modifications such that users can fine-tune haptic effect waveforms based on their preference.

Figure 1:
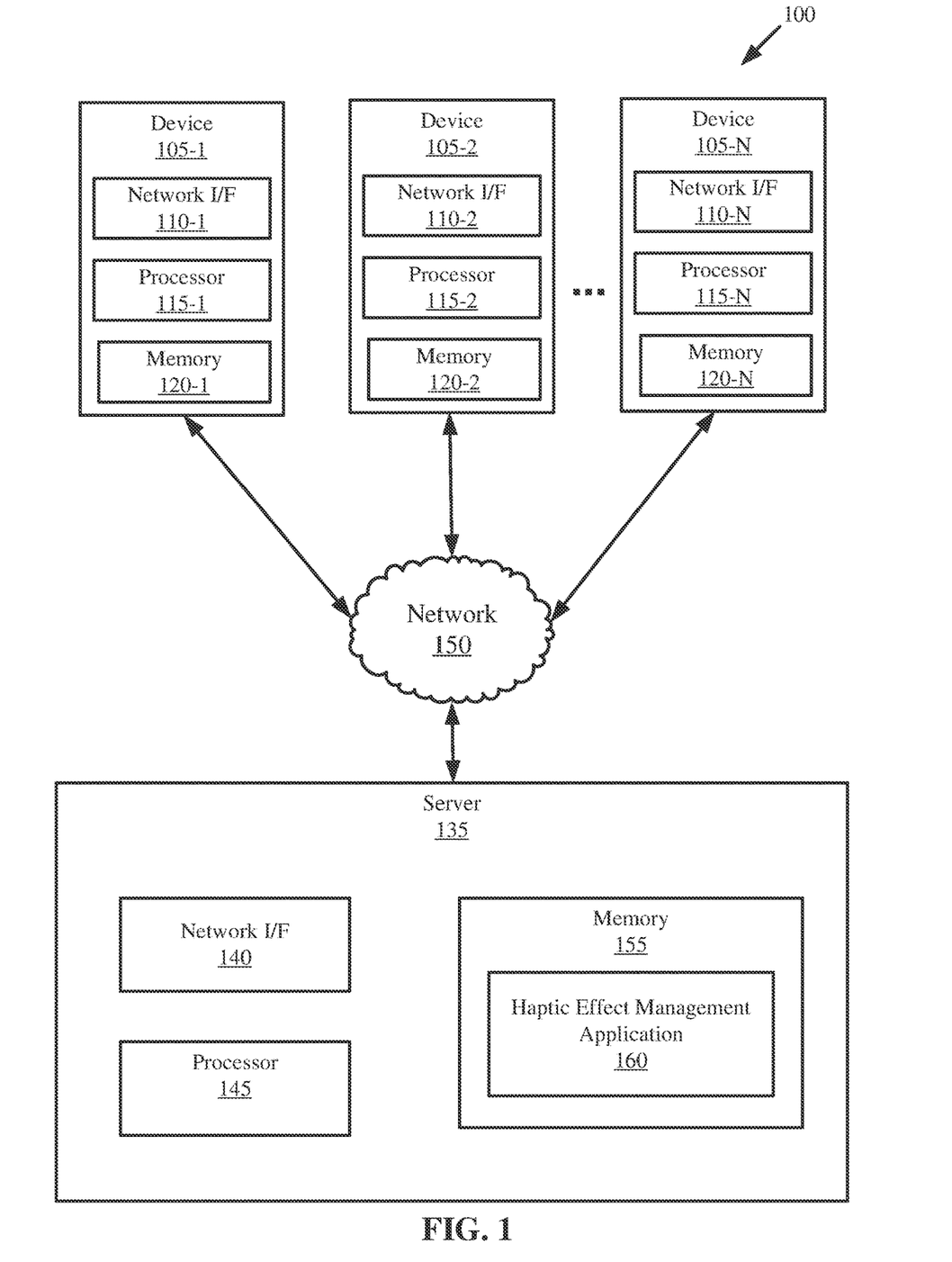
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera), and/or any commercially available or custom software (e.g., browser software, communications software, server software, natural language processing software, search engine and/or web crawling software, image processing software, extended reality (XR) software, etc.). The devices 105 and/or the server 135 can be servers, desktops, laptops, financial transaction terminals, or hand-held devices. In some embodiments, the devices 105 and/or the server 135 may be substantially similar to, or the same as, computer system 501 described in FIG. 5.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 6.

The server 135 includes a haptic effect management application 160. The haptic effect management application 160 can be configured to obtain haptic effects captured within a physical environment, save captured haptic effects, modify captured haptic effects, visualize captured haptic effects, map captured haptic effects to software features, and issue control signals to generate haptic effects based on monitored software execution.

The haptic effect management application 160 can be configured to obtain haptic effects captured within a physical environment. In embodiments, vibration sensors (e.g., accelerometers, gyroscopes, Eddy-Current sensors, etc.) associated with one or more devices of a user can be configured to capture vibrations in a physical environment of the user. "Capturing" a haptic effect can include measuring (via a vibration sensor) the frequency/amplitude of a vibration over time and storing the measured waveform characteristics associated with the vibration. In embodiments, the user can be prompted to measure vibration of their environment by physically positioning a vibration sensor in a suitable location (e.g., a hard/flat surface) such that the vibration can captured.

The captured haptic effect (e.g., the measured waveform characteristics of the vibration) can be saved with a name corresponding to the contextual condition (e.g., event or object) which caused the vibration. For example, a first haptic effect captured while a train passed by a user can be saved with a name "Train." As another example, a second haptic effect captured while a train used a horn by a user can be saved with the name "Train Horn." Various haptic effects can be captured from an environment of a user and saved as captured haptic effects. Captured haptic effects can be stored within a haptic effect library, a datastore containing a plurality of captured haptic effects with their corresponding name, waveform characteristics, and other haptic effect metadata (e.g., reasons for capturing the haptic effect, a time/date the haptic effect was captured, a location the haptic effect was captured, a device or sensor identification which captured haptic effect, etc.).

In embodiments, the haptic effect management application 160 can be configured to visualize haptic effects. For example, the haptic effect management application 160 can be configured to generate visual representations of haptic effect waveforms stored within a haptic effect library. The visual representations of the haptic effect waveforms can then be displayed on user devices (e.g., devices 105). Visualized haptic effects can be presented to users to facilitate editing (e.g., modulating or otherwise modifying) stored haptic effects. For example, users can interact with visualized waveforms by modifying their frequency and amplitude (e.g., via a graphical user interface) to create different haptic effects using the originally captured haptic effects. In embodiments, vibration associated with viewed haptic effects can be generated (e.g., via a haptic actuator) while users are viewing visualized waveforms. This can facilitate user modification of haptic effects by allowing users to visualize and feel haptics effects before and after modification.

In embodiments, the haptic effect management application 160 can be configured to modify (e.g., modulate) a captured haptic effect. That is, the haptic effect management application 160 can be configured to adjust the frequency/amplitude of the waveform representing vibration of a haptic effect. Modification of haptic effects can be completed manually or automatically. For example, as discussed above, the haptic effect management application 160 can facilitate user modification of haptic effects via visualization of captured haptic effects. In some embodiments, the haptic effect management application 160 can automatically modify captured haptic effects. For example, the haptic effect management application 160 can be configured to remove noise from captured waveforms, increase or decrease intensity (e.g., amplitude) of captured waveforms, modify frequency of captured waveforms, etc. In embodiments, the haptic effect management application 160 can utilize one or more machine learning or digital signal processing (DSP) models to automatically modify a captured waveform representing a haptic effect. This can be completed to normalize, clean up (e.g., remove noise from), amplify, dampen, or otherwise modify a captured haptic effect. Modified haptic effects can be stored within the haptic effect library (e.g., replacing original haptic effect entries or generating new entries for modified haptic effects).

The haptic effect management application 160 can be configured to map one or more haptic effects stored within the haptic effect library to one or more software features. As discussed herein, mapping a haptic effect to a software feature can include defining a rule (e.g., within computer instructions/code) that causes a mapped haptic effect to be generated based on an observed software function, an observed software event, and/or an observed software object. Software functions that can be mapped to haptic effects include received user input operations (e.g., touch screen inputs), triggered software application features (e.g., interacting with an interactable element on a software application graphical user interface (GUI)), and triggered operating system (OS) features (e.g., interacting with an OS menu), among other software functions. Software events that can be mapped to haptic effects include observed multimedia events within video games and movies (e.g., a haptic effect can trigger at a particular timestamp within a video, such as a movie or cutscene). Software objects that can be mapped to haptic effects include software objects present within virtual reality environments, video games, holograms, and other software applications (e.g., a virtual car engine can be mapped to a haptic effect). Haptic effect mappings can be completed based on user input. For example, a user can indicate, on a graphical user interface, one or more mappings between haptic effects within a haptic effect library and software features of their device.

The mapping of haptic effects to software features can occur at any suitable level. For example, OS haptic effect mappings can be stored at the OS level (e.g., within an OS directory or registry) and software application haptic effect mappings can be stored at the software application level (e.g., within a game file or application file).

Software execution (e.g., on devices 105) can be monitored to determine whether any rules for triggering haptic effects specified within haptic effect mappings are satisfied. As discussed above, rules can be defined based on activated software functions (e.g., user inputs), observed software events, and observed software objects. In response to determining that a rule for triggering a mapped haptic effect is met (e.g., a software feature mapped to a haptic effect is activated), control signals can be sent to a haptic actuator for generating the mapped haptic effect. The control signals can modulate power applied to a haptic actuator such that it vibrates according to the waveform defining the haptic effect. The control signals consider the input waveform defining the haptic effect as well as real-time feedback received from the haptic actuator while it is in vibration such that appropriate power modulation is applied to generate the desired haptic effect.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Though reference is made to various functions for managing haptic effects being performed by haptic effect management application 160 residing on server 135, in embodiments, some or all of the functions performed by the haptic effect management application 160 can be performed by devices 105. For example, devices 105 can be configured to capture haptic effects within a physical environment, save captured haptic effects, modify captured haptic effects, visualize captured haptic effects, map captured haptic effects to software features, and generate haptic effects based on monitored software execution. In embodiments, functions for haptic effect management can be distributed between the server 135 and devices 105. For example, the server 135 can be configured to modify, visualize, and map haptic effects, while the devices 105 can be configured to capture and generate haptic effects. However, any suitable number of functions for haptic effect management can be performed by any suitable number and type of devices.

Figure 2:
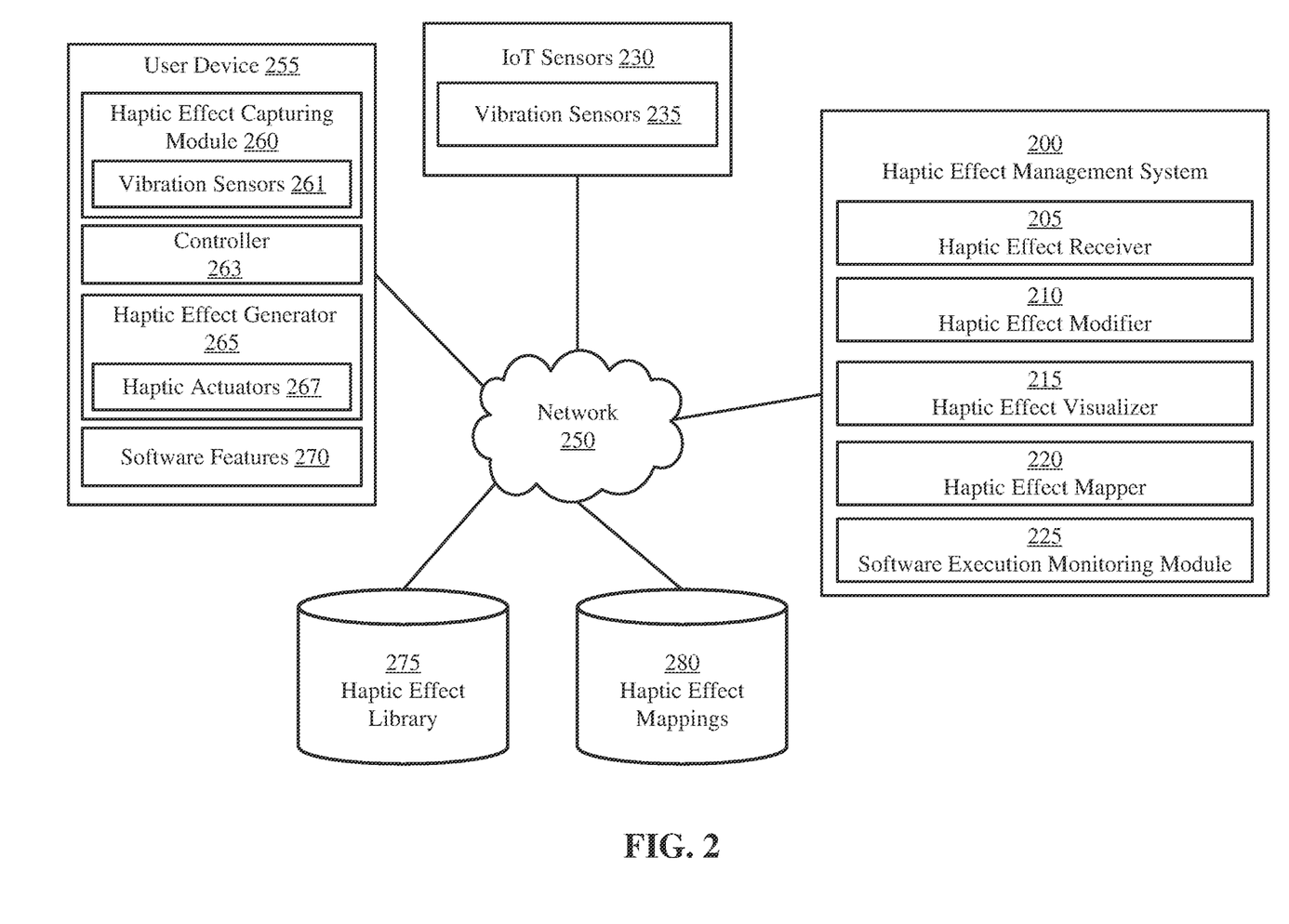
FIG. 2 is a block diagram illustrating an IoT environment, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250, such as, but not limited to, a haptic effect management system 200, IoT sensors 230, a user device 255, a haptic effect library 275, and haptic effect mappings 280. The various components within the IoT environment can be processor executable instructions that can be executed by a dedicated or shared processor using received inputs.

The haptic effect management system 200 and user device 255 within the IoT environment can be configured to cooperatively capture haptic effects within physical environments, save captured haptic effects, modify captured haptic effects, visualize captured haptic effects, map captured haptic effects to software features, and generate haptic effects based on monitored software execution.

The haptic effect management system 200 includes a haptic effect receiver 205, a haptic effect modifier 210, a haptic effect visualizer 215, a haptic effect mapper 220, and a software execution monitoring module 225. The functions of the haptic effect receiver 205, haptic effect modifier 210, haptic effect visualizer 215, haptic effect mapper 220, and software execution monitoring module 225 can be processor executable instructions that can be executed by a dedicated or shared processor using received inputs.

The haptic effect receiver 205 can be configured to receive captured haptic effects. Haptic effects can be captured by vibration sensors 261 of a haptic effect capturing module 260 of user device 255 and/or vibration sensors 235 of internet of things (IoT) sensors 230. Capturing a haptic effect can include measuring vibration (e.g., via a vibration sensors 261 of user device 255 or the vibration sensors 235 of IoT devices 230) associated with a physical environment and storing the waveform representing the vibration as the captured haptic effect. Any suitable type of vibration sensor can be configured to capture haptic effects, including, among other types of vibration sensors, accelerometers, gyroscopes, Eddie-Current sensors, strain gauges, laser displacement sensors, and microphone vibration sensors.

In embodiments, the waveform representing the haptic effect vibration can be saved as a file in any suitable format (e.g., a .wav or haptic audio pattern (HAP) file format) upon capture by user device 255. The waveform file can then be transmitted from the device 255 to the haptic effect receiver 205 of the haptic effect management system 200. The waveform (e.g., a sine wave) specifies the frequency/amplitude required to generate the vibration associated with the captured haptic effect. The waveform representing the haptic effect can be used to generate a control signal by a controller 263. The control signal generated by controller 263 can modulate power (received from a battery or power supply of device 255, not shown) provided to haptic actuators 267 of a haptic effect generator 265 to generate vibrations corresponding to the haptic effect waveform. In embodiments, the controller 263 continuously monitors vibration of haptic actuators 267 (e.g., received as feedback signals) during vibration to issue additional control signals modulating power provided to haptic actuators 267 such that vibration of the haptic actuators 267 substantially matches the haptic effect waveform.

The captured haptic effects received by the haptic effect receiver 205 can be stored within haptic effect library 275. The haptic effect library 275 is a datastore which can include a plurality of stored haptic effects. The haptic effect library 275 can be organized in any suitable format (e.g., a table or list) and can be stored on any suitable storage medium (e.g., a solid state drive or hard disk drive). Each haptic effect entry within the haptic effect library can include a name specifying a contextual condition in which each haptic effect was captured, a waveform representing the vibration of each haptic effect, and additional haptic effect metadata. The additional haptic effect metadata can specify a time/date each haptic effect was captured, a vibration sensor (or device) that captured the haptic effect, a location the haptic effect was captured, a reason for capturing the haptic effect, and other potential metadata. The haptic effect library can be updated over time to include newly captured haptic effects and modified haptic effects. An example haptic effect library 275 is illustrated in Table 1.

TABLE 1

Example Haptic Effect Library

| Haptic Effect | Name | Waveform | Time | Date | Vibration Sensor |
|---|---|---|---|---|---|
| 1 | Train | Train Waveform File | 3:00:43 PM | 15 Mar. 2020 | Tablet |
| 2 | Plane | Plane Waveform File | 5:55:23 PM | 23 Mar. 2020 | Smart Phone |
| 3 | Truck | Truck Waveform File | 7:23:40 PM | 27 Mar. 2020 | Wearable |
| 4 | Car | Car Waveform File | 6:01:45 PM | 28 Mar. 2020 | Smart Phone |
| 5 | Siren | Siren Waveform File | 7:25:11 PM | 29 Mar. 2020 | Smart Phone |
| 6 | Rock Concert | Rock Concert Waveform File | 2:05:51 PM | 4 Apr. 2020 | Wearable |
| 7 | Waves | Waves Waveform File | 4:23:31 PM | 8 Apr. 2020 | Tablet |
| 8 | Motorcycle | Motorcycle Waveform File | 10:55:43 PM | 15 Apr. 2020 | Smart Phone |

As depicted in Table 1, eight haptic effects are stored within an example haptic effect library. The name of each haptic effect corresponds to the contextual condition (e.g., object or event) which generated the vibrations corresponding to the captured haptic effect. A waveform file is stored with each corresponding captured haptic effect. A date and time each haptic effect was captured are stored as metadata with each corresponding captured haptic effect. Lastly, a device which captured each haptic effect is stored with each haptic effect.

It is noted that Table 1 illustrates an exemplary haptic effect library. Aspects of the present disclosure recognize that the number of stored haptic effects, type of haptic effects (e.g., train, plane, truck, etc.), and the number of haptic effect metadata fields (e.g., name, waveform files, date, time, vibration sensor, etc.) can vary without departing from the spirit and scope of the present disclosure.

The haptic effect modifier 210 can be configured to modify haptic effects received by the haptic effect receiver 205. In particular, the haptic effect modifier 210 can be configured to modify the frequency and/or amplitude of haptic effect waveforms. Modification of haptic effects can be completed manually (e.g., users can modify haptic effect waveforms) and/or automatically (e.g., machine learning and DSP models can be configured to modify haptic effect waveforms). Modified haptic effects can be stored within haptic effect library 275. In some embodiments, modified haptic effects can replace their original captured haptic effect entries. In some embodiments, new entries can be generated for modified haptic effects (e.g., originally captured haptic effects can be maintained in different entries).

In embodiments, manual modification of haptic effects can be facilitated by haptic effect visualizer 215. The haptic effect visualizer 215 can be configured to generate a visual representation of a haptic effect waveform for display on a device (e.g., user device 255). Captured haptic effect waveforms can be visualized on screens of electronic devices, virtual reality (VR) displays, computer monitors, and other types of displays. Visualizing haptic effects can allow users to fine-tune desired waveform properties for captured haptic effects. As an example, if a haptic effect is not as intense as a user desires, a user can increase the amplitude of the waveform of the haptic effect using a control associated with the haptic effect visualizer 215. A variety of controls can be presented to users to allow users to modify haptic effects waveforms. For example, a graphical user interface (GUI) of the haptic effect visualizer 215 can include amplitude, frequency, and time-based controls. The inputs received from the user via the haptic effect visualizer 215 can be provided to the haptic effect modifier 210 such that haptic effect waveform files can be updated based on the user input.

In embodiments, while a user is editing a haptic effect waveform during visualization, the haptic effect vibration associated with the waveform can be generated (presented to the user) by haptic effect generator 265 to allow the user to feel the haptic effect before and after modification. For example, upon making a change to the haptic effect waveform, the modified haptic effect waveform vibration can be presented to the user to allow the user to determine whether they are satisfied with the modification or whether they wish to make further modifications (e.g., or revert the modifications). In response to receiving user input indicating that the user is satisfied with the updated haptic effect, the haptic effect can be stored in the haptic effect library 275. Thus, aspects of the present disclosure enable users to modify haptic effect waveforms in an iterative manner based on vibrations experienced by the user before and after modifications are applied.

In embodiments, the haptic effect modifier 210 can automatically modify captured haptic effects. For example, the haptic effect modifier 210 can be configured to automatically (e.g., based on a script or model) remove noise from captured waveforms, increase or decrease intensity (e.g., amplitude) of captured waveforms, modify frequency of captured waveforms, etc. In embodiments, the haptic effect modifier 210 can utilize one or more machine learning models to automatically modify a captured waveform representing a haptic effect. For example, artificial neural networks (ANNs) and regression analysis models can be configured to alter haptic effect waveforms. In embodiments, the haptic effect modifier 210 can utilize one or more analog or digital signal processing (DSP) techniques (e.g., Laplace transform, Prony's method, Fourier Transforms, wavelet transforms, etc.) to automatically modify a waveform representing a haptic effect. Automatic modification of haptic effect waveforms can be completed to normalize, clean up (e.g., remove noise from), amplify, dampen, or otherwise modify a captured haptic effect. Modifications executed by the haptic effect modifier 210 can be applied to the waveform files of haptic effects stored in haptic effect library 275.

The haptic effect mapper 220 can be configured to generate haptic effect mappings 280 between haptic effects stored within the haptic effect library 275 and software features 270 of the user device 255. Haptic effect mappings are defined rules that trigger the generation of a mapped haptic effect based on activation of software features 270. Haptic effect mappings can be user-defined rules specifying particular haptic effects to be triggered in particular circumstances. For example, users can map haptic effects in haptic effect library 275 to particular types of input interactions. For example, on a touch screen, a first haptic effect can be mapped to a first type of touch input (e.g., a swipe), a second haptic effect can be mapped to a second type of touch input (e.g., a tap), a third haptic effect can be mapped to a third type of touch input (e.g., a tap and hold), a fourth type of touch input can be mapped to a fourth type of touch input (e.g., a double tap), etc. In this example, activation of the above touch inputs can lead to generation of corresponding haptic effects (e.g., issued through the touch screen by a haptic actuator). Other types of input interactions can also be mapped to captured/modified haptic effects. For example, activation of a first button on a controller can lead to the generation of a first haptic effect (by the controller) and activation of a second button on a controller can lead to generation of a second haptic effect.

In embodiments, users can map software/OS functionalities to haptic effects within the haptic effect library. For example, activation of a first application function (e.g., a first button displayed on a graphical user interface within the software application) can lead to a corresponding mapped haptic effect. Similarly, activation of a first operating system function (e.g., a first interactable element displayed on an OS menu) can lead to a corresponding mapped haptic effect. Any suitable type of function can be mapped to any desired haptic effect.

In embodiments, users can also map haptic effects to particular observed software events. For example, a user can map a haptic effect to a particular timestamp within a video. As an example, a timestamp within a video where a spaceship launches can be mapped to a captured haptic effect, such as a haptic effect captured (by a vibration sensor)

during a spaceship launch in the physical world. In this example, upon observation of the timestamp (e.g., the software event), the haptic effect mapped to the timestamp can be triggered. In embodiments, users can map haptic effects to detected object identities (e.g., determined via an object detection algorithm). In response to detecting an object identity mapped to a haptic effect (e.g., within an image, video, or webpage), the haptic effect mapped to the object identity can be generated.

In embodiments, users can map haptic effects to virtual objects within video games and/or virtual reality. For example, virtual water in virtual reality can be mapped to a particular haptic effect such that the haptic effect is generated when the virtual water is interacted with. Similarly, a virtual car within a video game or virtual reality game can be mapped to a haptic effect such that the haptic effect is generated when the virtual car is interacted with. In these embodiments, haptic effect amplitude can be defined as a function of proximity to the object mapped to the haptic effect. Thus, the haptic effect can be modulated as a function of distance from a user within a video game or within virtual reality, to provide greater immersion. This can be completed as if a user is farther from an object, the vibration from the object would be less intense (e.g., a lower amplitude). In embodiments, a hologram can be mapped to a haptic effect. For example, upon interacting with a displayed hologram, a corresponding haptic effect can be issued to a haptic actuator associated with a user.

A software execution monitoring module 225 can be configured to monitor software execution to determine whether any software features 270 corresponding to mapped haptic effects are activated. In response to determining that a software feature 270 mapped to a haptic effect is activated, the haptic effect generator 265 can be configured activate a haptic actuator 267 to generate vibration based on the input waveform defined by the mapped haptic effect.

As discussed above, activated software features 270 can be based on observed software functions, observed software events, and/or an observed software objects. Software functions that can be mapped to haptic effects include received user input operations, triggered software application features (e.g., interactable software application features), and triggered operating system (OS) features (e.g., interactable OS features), among other software functions. Software events that can be mapped to haptic effects include observed multimedia events (e.g., a cutscene timestamp within a videogame). Software objects that can be mapped to haptic effects include software objects present within virtual reality environments, video games, and other software applications (e.g., a boat within a video game and be mapped to a haptic effect corresponding to a boat).

Though mappings between stored haptic effects and software features 270 are illustrated as being stored within haptic effect mappings 280, mappings can be stored in any suitable location. For example, OS haptic effect mappings can be stored at the OS level (e.g., within an OS directory or registry) and software application haptic effect mappings can be stored at the software application level (e.g., within a game file or application file).

The software execution monitoring module 225 can be configured monitor software execution on device 255 to determine whether any rules for triggering haptic effects defined in haptic effect mappings 280 are satisfied. As discussed above, rules can be defined based on activated software functions (e.g., user inputs), observed software events, and observed software objects. In response to determining that a rule for triggering a mapped haptic effect is satisfied, control signals (e.g., generated by controller 263 or haptic effect management system 200) can be sent to haptic actuators 267 for generating the mapped haptic effect. The control signals can modulate power applied to a haptic actuator such that it vibrates according to the waveform defining the haptic effect. The control signals consider the input waveform defining the haptic effect as well as real-time feedback received from the haptic actuator while it is in vibration such that appropriate power modulation is applied to generate the desired haptic effect.

It is noted that FIG. 2 is intended to depict the representative major components of example computing environment. In some embodiments, however, individual components can have greater or lesser complexity than as represented in FIG. 2, components other than or in addition to those shown in FIG. 2 can be present, and the number, type, and configuration of such components can vary.

Figure 3:
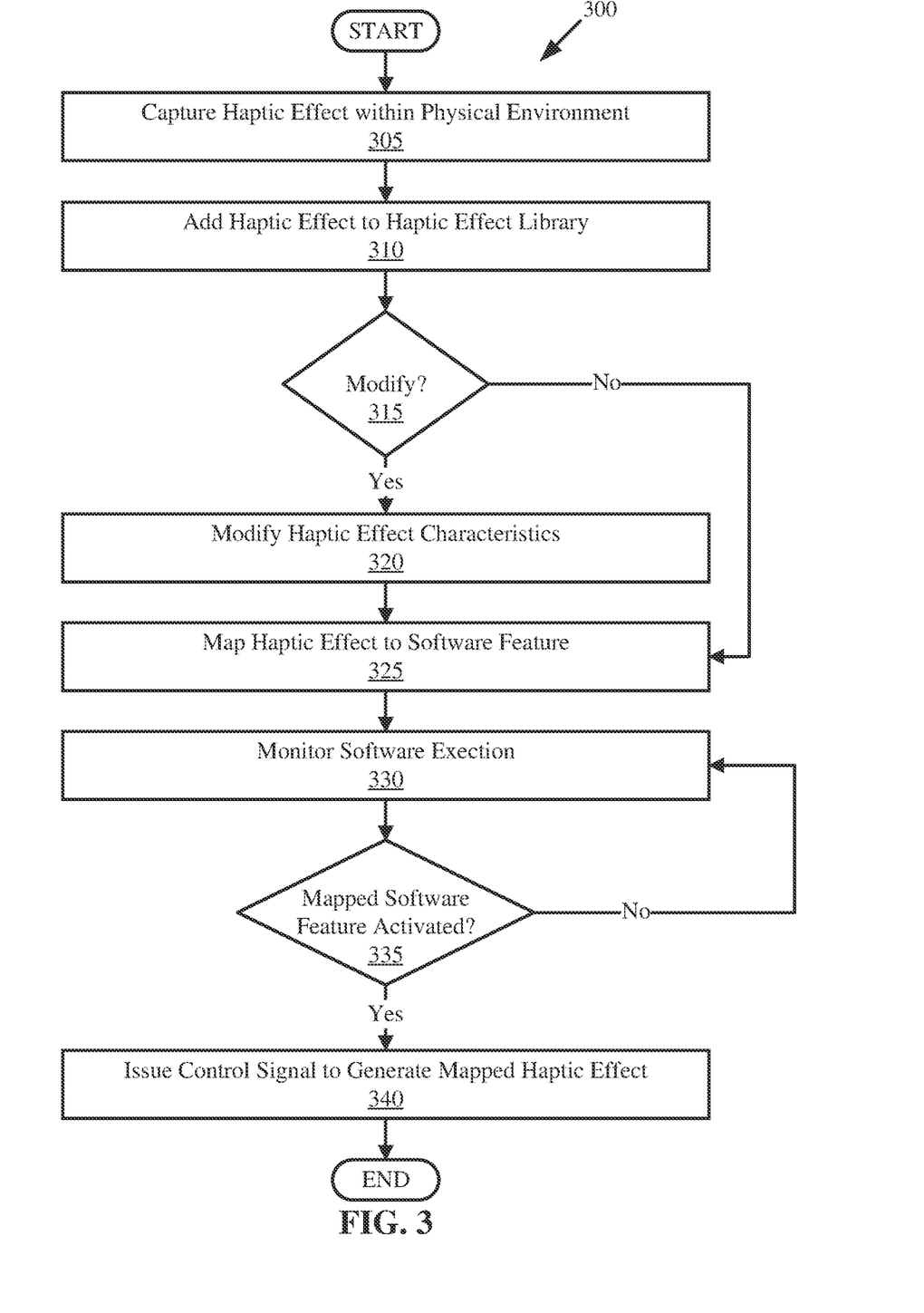
FIG. 3 is a flow-diagram illustrating an example method for haptic effect management, in accordance with embodiments of the present disclosure.

Referring now to FIG. 3, shown is a flow-diagram illustrating an example method 300 for haptic effect management, in accordance with embodiments of the present disclosure. One or more operations of method 300 can be completed by one or more computing devices (e.g., devices 105, server 135, haptic effect management system 200, user device 255, IoT sensors 230).

Method 300 initiates at operation 305, where a haptic effect is captured within a physical environment. The haptic effect can be captured using a vibration sensor of a device in possession of a user. In embodiments, the haptic effect captured by the vibration sensor can be transmitted to a server or other device for processing. Capturing a haptic effect includes capturing a waveform defining vibration of the haptic effect.

The captured haptic effect is then added to a haptic effect library. This is illustrated at operation 310. The haptic effect library can be the same as, or substantially similar to, haptic effect library 275 depicted in FIG. 2. The haptic effect library can store a plurality of captured haptic effects with corresponding names of contextual conditions in which each haptic effect was captured as well as with their corresponding waveforms.

A determination is made whether to modify the captured haptic effect. This is illustrated at operation 315. Modification of the haptic effect can be completed in the same, or a substantially similar manner, as described with respect to the haptic effect modifier 210 of FIG. 2. In embodiments, modification of the haptic effect can include modulating the waveform defining the haptic effect, either manually or automatically. If a determination is made to modify the haptic effect, "Yes" at operation 315, then the haptic effect is modified. This is illustrated at operation 320. The modification of the haptic effect can be completed based on user input (e.g., manual input redefining the amplitude/frequency of the haptic effect waveform) and/or automatically by a digital signal processing (DSP) or machine learning (ML) algorithm (e.g., a script or model can be configured to modify the amplitude/frequency of the haptic effect).

If a determination is made to not modify the captured haptic effect, "No" at operation 315 (e.g., the user is satisfied with the original capture), then the haptic effect is mapped to a software feature. This is illustrated at operation 325. Mapping the haptic effect to a software feature can include defining a rule (e.g., by a user on a graphical user interface) indicating that the mapped haptic effect is triggered in response to a mapped software feature being activated. Haptic effects can be mapped to any suitable software feature, including user input operations, software functions, operating system functions, software events, and software objects.

Software execution is monitored. This is illustrated at operation 330. Software execution can be monitored to determine whether any mapped software features are activated at operation 335. If a determination is made that a mapped software feature is activated, "Yes" at operation 335, then a control signal is issued (e.g., to a haptic actuator) to generate the mapped haptic effect. This is illustrated at operation 340. If a determination is made that a mapped software feature is not activated, "No" at operation 335, then method 300 can return to operation 330, where software execution can continue to be monitored. Thus, aspects of the present disclosure can loop between operations 330 and 335 until a mapped software feature is determined to be activated. Upon identification of any activated software features mapped to haptic effects, corresponding haptic effects can be generated (e.g., by a haptic actuator in response to control signals).

The aforementioned operations can be completed in any order and are not limited to those described. Additionally, some, all, or none of the aforementioned operations can be completed, while still remaining within the spirit and scope of the present disclosure.

Figure 4:
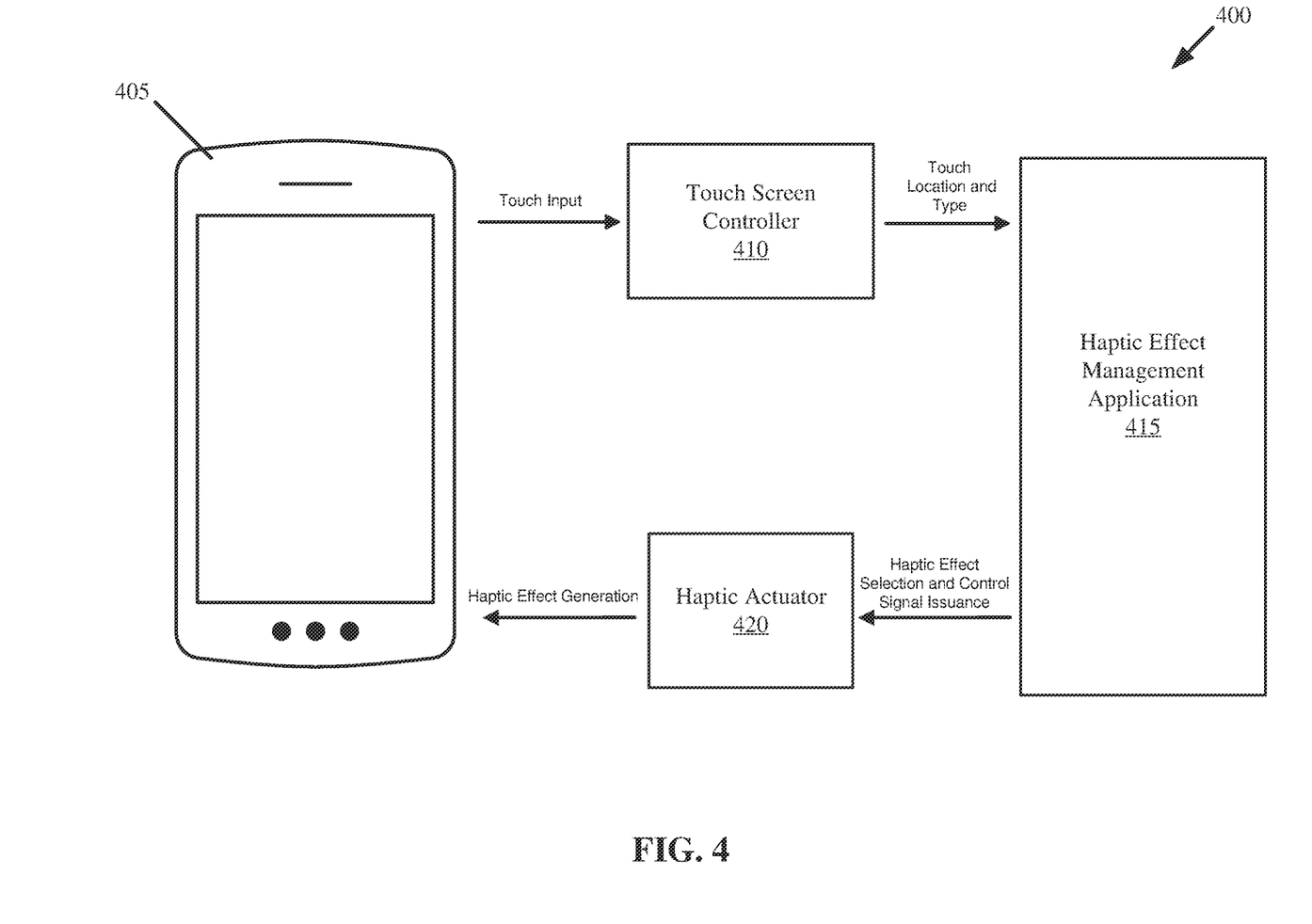
FIG. 4 is a diagram illustrating haptic effect generation based on a received touch input, in accordance with embodiments of the present disclosure.

Referring now to FIG. 4, shown is a diagram 400 for generating a mapped haptic effect (e.g., haptic feedback or tactile feedback) based on a received touch input, in accordance with embodiments of the present disclosure. A touch input can first be received on a touch screen of the device 405. A touch screen controller 410 can be configured to determine a touch type and a touch location associated with the touch input on the touch screen. The touch location and touch type can be transmitted to a haptic effect management application 415 (e.g., haptic effect management application 160 or haptic effect management system 200) to determine whether the touch type corresponds to any mapped haptic effects. In response to determining that the touch type corresponds to a mapped haptic effect, the haptic effect management application 415 can be configured to select the mapped haptic effect and issue a control signal to a haptic actuator 420 for generating the mapped haptic effect. The haptic effect generated by the haptic actuator 420 can then be generated on the touch screen of the device 405. In embodiments, the location of the touch input can be used to issue the haptic feedback at the location associated with the received touch input. For example, if multiple haptic actuators 420 are implemented within touch screen, a haptic actuator nearest the touch input can be activated an all other haptic actuators may remain inactive.

Figure 5:
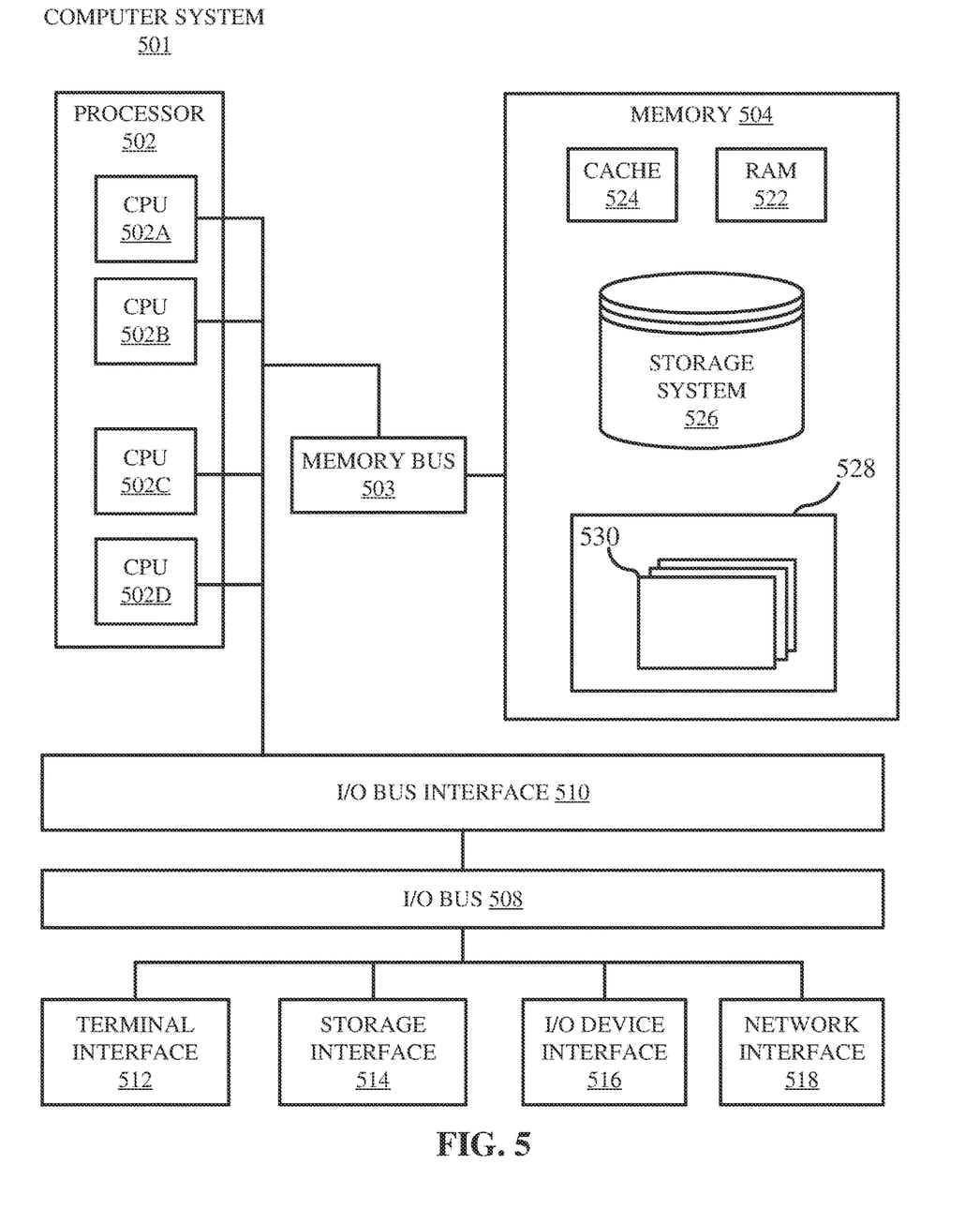
FIG. 5 is a high-level block diagram illustrating an example computer system that can be used in implementing one or more of the methods, tools, modules, and any related functions described herein, in accordance with embodiments of the present disclosure.

Referring now to FIG. 5, shown is a high-level block diagram of an example computer system 501 that may be utilized in various devices discussed herein (e.g., devices 105, server 135, haptic effect management system 200, user device 255, and IoT sensors 230, device 405, haptic effect management application 415, touch screen controller 410, haptic actuator 420, etc.) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502 (also referred to as processors herein), a memory 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

Memory 504 may include computer system readable media in the form of volatile memory, such as random-access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
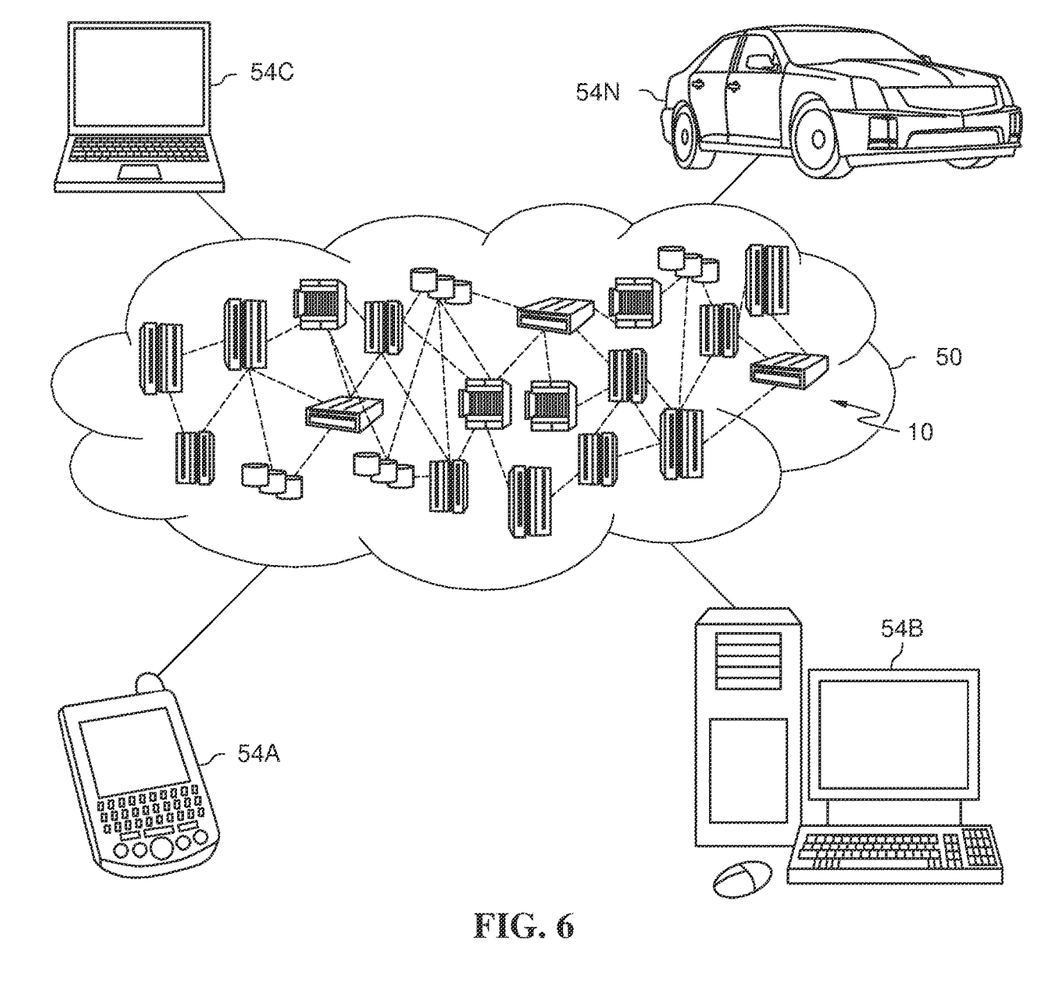
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
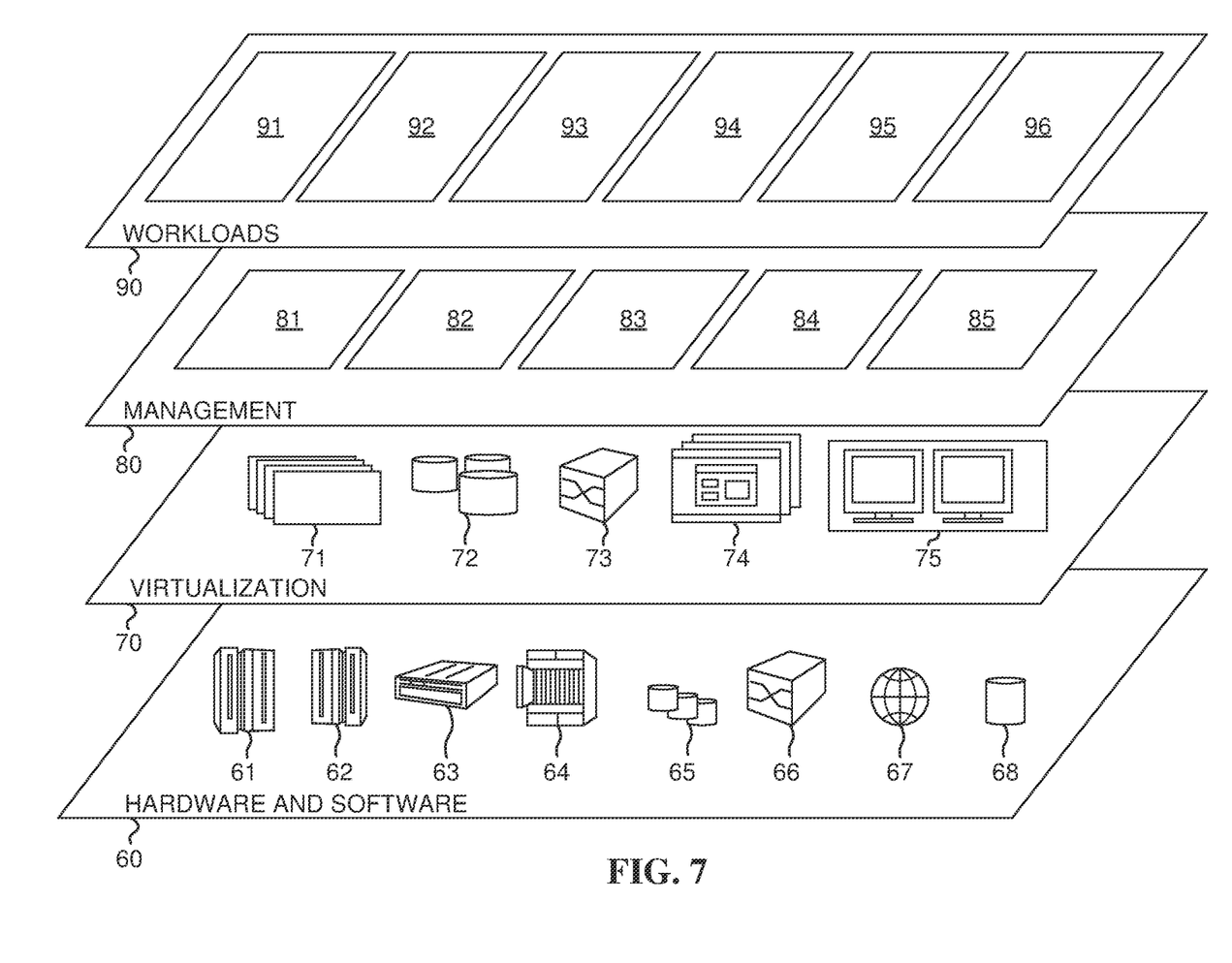
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and haptic effect management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    obtaining a haptic effect that is captured using a vibration sensor from a physical environment in real-time during a particular contextual condition, the haptic effect defined by a waveform;
    saving the haptic effect with a name corresponding to the particular contextual condition that the haptic effect is captured from in real-time using the vibration sensor to a haptic effect library, the haptic effect library containing a plurality of captured haptic effects; and
    mapping the haptic effect to at least one software feature, wherein the haptic effect is generated in response to the at least one software feature being activated.

2. The method of claim 1, further comprising:
    generating a visual representation of the waveform defining the haptic effect;
    transmitting the visual representation of the waveform to a user device;
    receiving a user input modifying characteristics of the waveform on the visual representation; and
    updating the haptic effect based on the user input.

3. The method of claim 2, further comprising:
- issuing a control signal to generate the updated haptic effect on the user device;
- receiving a second user input indicating a user is satisfied with the updated haptic effect; and
- saving the updated haptic effect to the haptic effect library.

4. The method of claim 1, wherein the waveform is saved as a waveform file associated with the haptic effect within the haptic effect library.

5. The method of claim 1, wherein the haptic effect is mapped to a touch type, wherein the haptic effect is generated by a haptic actuator in response to observing the touch type on a touch screen.

6. The method of claim 1, wherein the haptic effect is mapped to a software function, wherein the haptic effect is generated by a haptic actuator in response to activation of the software function.

7. The method of claim 1, wherein the haptic effect is mapped to a first object, wherein the method further comprises:
- detecting, via object detection, the first object within a video; and
- activating the haptic effect in response to detecting the first object within the video.

8. The method of claim 1, wherein the haptic effect is mapped to a first timestamp of a video, wherein the method further comprises:
- activating the haptic effect, for a predetermined amount of time, in response to a current playtime of the video being the first timestamp.

9. The method of claim 1, wherein the haptic effect is mapped to a virtual object, wherein the haptic effect is generated when the virtual object is interacted with.

10. A system comprising:
- one or more processors; and
- one or more computer-readable storage media collectively storing program instructions which, when executed by the one or more processors, are configured to cause the one or more processors to perform a method comprising:
  - capturing, by a vibration sensor of a user device and from a physical environment in real-time during a particular contextual condition, a haptic effect, the haptic effect defined by a waveform;
  - saving the haptic effect with a name corresponding to the particular contextual condition that the haptic effect is captured from in real-time using the vibration sensor to a haptic effect library, the haptic effect library containing a plurality of captured haptic effects; and
  - mapping the haptic effect to at least one software feature, wherein the haptic effect is generated in response to the at least one software feature being activated.

11. The system of claim 10, wherein the method performed by the one or more processors further comprises:
- generating a visual representation of the waveform defining the haptic effect;
- transmitting the visual representation of the waveform to the user device;
- receiving a user input modifying characteristics of the waveform on the visual representation; and
- updating the haptic effect based on the user input.

12. The system of claim 11, wherein the method performed by the one or more processors further comprises:
- issuing a control signal to generate the updated haptic effect on the user device;
- receiving a second user input indicating a user is satisfied with the updated haptic effect; and
- saving the updated haptic effect to the haptic effect library.

13. The system of claim 10, wherein the waveform is saved as a waveform file associated with the haptic effect within the haptic effect library.

14. The system of claim 10, wherein the haptic effect is mapped to a touch type, wherein the haptic effect is generated by a haptic actuator in response to observing the touch type on a touch screen.

15. The system of claim 10, wherein the haptic effect is mapped to a software function, wherein the haptic effect is generated by a haptic actuator in response to activation of the software function.

16. A computer program product comprising one or more computer readable storage media, and program instructions collectively stored on the one or more computer readable storage media, the program instructions comprising instructions configured to cause one or more processors to perform a method comprising:
- obtaining a haptic effect that is captured using a vibration sensor from a physical environment in real-time during a particular contextual condition, the haptic effect defined by a waveform;
- saving the haptic effect with a name corresponding to the particular contextual condition that the haptic effect is captured from in real-time using the vibration sensor to a haptic effect library, the haptic effect library containing a plurality of captured haptic effects; and
- mapping the haptic effect to at least one software feature, wherein the haptic effect is generated in response to the at least one software feature being activated.

17. The computer program product of claim 16, wherein the method performed by the one or more processors further comprises:
- generating a visual representation of the waveform defining the haptic effect;
- transmitting the visual representation of the waveform to a user device;
- receiving a user input modifying characteristics of the waveform on the visual representation; and
- updating the haptic effect based on the user input.

18. The computer program product of claim 17, wherein the method performed by the one or more processors further comprises:
- issuing a control signal to generate the updated haptic effect on the user device;
- receiving a second user input indicating a user is satisfied with the updated haptic effect; and
- saving the updated haptic effect to the haptic effect library.

19. The computer program product of claim 16, wherein the waveform is saved as a waveform file associated with the haptic effect within the haptic effect library.

20. The computer program product of claim 16, wherein the haptic effect is mapped to an operating system function, wherein the haptic effect is generated by a haptic actuator in response to activation of the operating system function.

* * * * *